United States Patent
Lee

(10) Patent No.: US 9,387,735 B2
(45) Date of Patent: Jul. 12, 2016

(54) TIRE PRESSURE MONITORING SYSTEM OF MOTOR DRIVEN VEHICLE AND METHOD THEREOF

(71) Applicant: HYUNDAI MOTOR COMPANY, Seoul (KR)

(72) Inventor: Minsu Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 3 days.

(21) Appl. No.: 14/546,917

(22) Filed: Nov. 18, 2014

(65) Prior Publication Data

US 2015/0343860 A1    Dec. 3, 2015

(30) Foreign Application Priority Data

Jun. 2, 2014    (KR) ................ 10-2014-0067186

(51) Int. Cl.
| | |
|---|---|
| *B60C 23/04* | (2006.01) |
| *B60C 23/06* | (2006.01) |
| *B60W 30/02* | (2012.01) |
| *B60W 40/12* | (2012.01) |
| *B60L 3/10* | (2006.01) |

(52) U.S. Cl.
CPC ........... *B60C 23/0488* (2013.01); *B60C 23/061* (2013.01); *B60L 3/102* (2013.01); *B60L 3/104* (2013.01); *B60W 30/02* (2013.01); *B60W 40/12* (2013.01); *B60L 2240/465* (2013.01); *B60W 2400/00* (2013.01); *B60W 2520/26* (2013.01); *B60W 2720/26* (2013.01)

(58) Field of Classification Search
CPC . B60W 30/02; B60W 40/12; B60W 2400/00; B60W 2520/26; B60W 2720/26; B60C 23/0488; B60L 3/102; B60L 3/104; B60L 2240/465
See application file for complete search history.

(56) References Cited

U.S. PATENT DOCUMENTS

| | | | |
|---|---|---|---|
| 7,263,458 B2 | 8/2007 | Hall et al. | |
| 8,083,557 B2* | 12/2011 | Sullivan | ................ B60F 3/0007 290/54 |
| 8,494,704 B2 | 7/2013 | Hall et al. | |
| 8,718,897 B2* | 5/2014 | Wright | .................... B60L 15/20 180/197 |
| 2010/0164704 A1 | 7/2010 | Lindskog et al. | |
| 2010/0182142 A1 | 7/2010 | Svedberg et al. | |
| 2010/0191483 A1 | 7/2010 | Gustavsson et al. | |
| 2010/0191495 A1 | 7/2010 | Drevo et al. | |
| 2010/0217471 A1 | 8/2010 | Stenman et al. | |
| 2010/0318308 A1 | 12/2010 | Gustavsson et al. | |

(Continued)

FOREIGN PATENT DOCUMENTS

| | | |
|---|---|---|
| EP | 1272365 B1 | 3/2010 |
| EP | 2202101 B1 | 6/2011 |
| JP | 2009-150834 A | 7/2009 |

(Continued)

*Primary Examiner* — Russell Frejd
(74) *Attorney, Agent, or Firm* — McDermott Will & Emery LLP

(57) ABSTRACT

A tire pressure monitoring system includes a resolver for detecting a motor speed generating driving torque. A wheel speed sensor detects a wheel speed of wheels rotated by the driving torque generated at the motor. A transmission decelerates the driving torque generated at the motor. A controller is configured to compare a first target wheel speed calculated using the motor speed detected by the resolver to the wheel speed sensor detected by the wheel speed sensor and determining a status of a tire, when a wheel slip ratio is less than a predetermined value.

14 Claims, 3 Drawing Sheets

(56) References Cited

U.S. PATENT DOCUMENTS

2011/0066322 A1 3/2011 Karlsson et al.
2011/0231051 A1 9/2011 Gerdin et al.

FOREIGN PATENT DOCUMENTS

| JP | 2013-056569 A | 3/2013 |
| WO | 2008113376 A1 | 9/2008 |

* cited by examiner

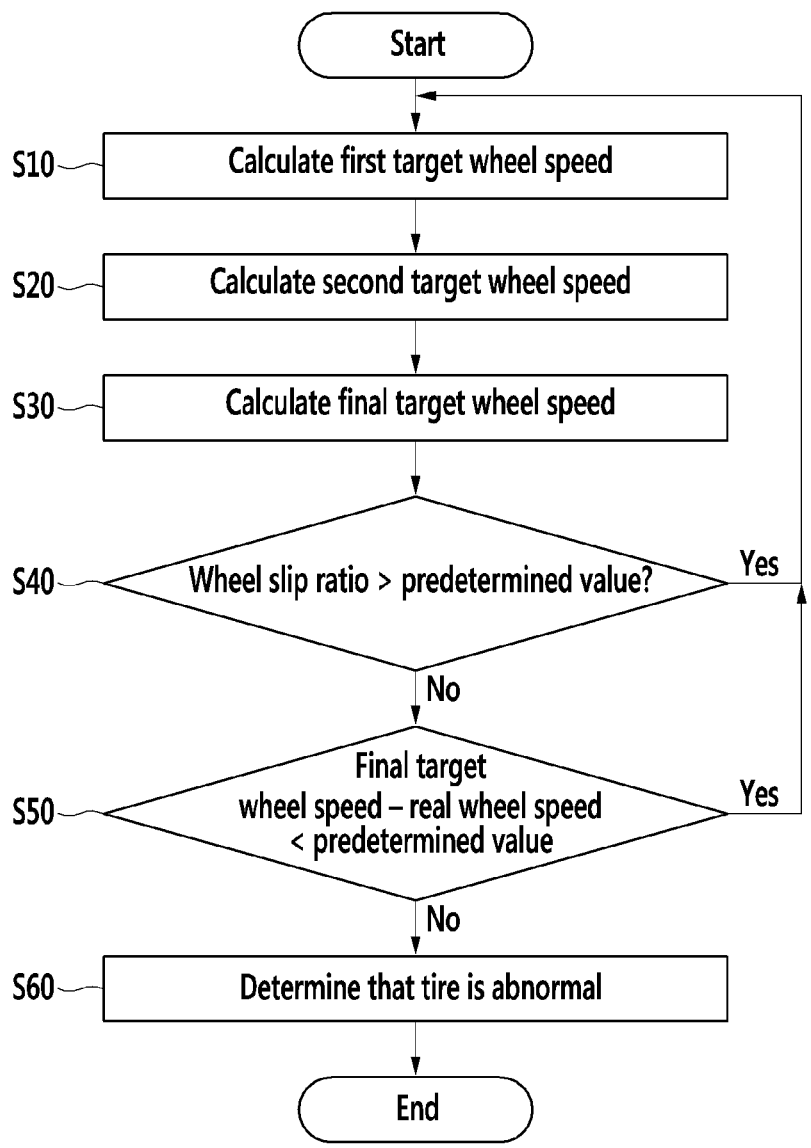

TIRE PRESSURE MONITORING SYSTEM OF MOTOR DRIVEN VEHICLE AND METHOD THEREOF

CROSS-REFERENCE TO RELATED APPLICATION

This application claims the benefit of priority to Korean Patent Application No. 10-2014-0067186 filed in the Korean Intellectual Property Office on Jun. 2, 2014, the entire contents of which are incorporated herein by reference.

TECHNICAL FIELD

The present disclosure relates to a tire pressure monitoring system of a motor driven vehicle and a tire pressure monitoring method. More particularly, the present disclosure relates to a tire pressure monitoring system of a motor driven vehicle and a tire pressure monitoring method for indirectly monitoring tire pressure.

BACKGROUND

If a tire pressure of a vehicle is too high or low, a tire may blow, or the vehicle may easily skid, possibly causing a large accident. Further, fuel consumption of the vehicle becomes high, thus lowering fuel efficiency. In addition, a life span of the tire becomes short, and the comfort and braking force of the vehicle severely deteriorate.

In detail, when a tire pressure is low, a hydroplaning phenomenon and a standing wave phenomenon may cause. When a temperature of the tire is excessively high, a heat separation phenomenon may occur.

As described above, a tire plays an important role in safe operation of a vehicle, and thus, a tire pressure monitoring system (TPMS) also called an automatic tire pressure detecting system or a tire pressure detecting system is mounted on the tire to detect a defect of the tire in advance.

According to the conventional tire pressure monitoring system, a tire status is determined by measuring air pressure and air temperature of tires through sensors provided in the tires.

However, according to the conventional art, since the sensors are provided in the tires for measuring the air pressure and the air temperature of the tires, manufacturing cost is increased.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a tire pressure monitoring system that can determine a status of a tire without additional sensors.

A tire pressure monitoring system according to an exemplary embodiment of the present inventive concept may include a resolver for detecting a speed of a motor which generates a driving torque. A wheel speed sensor detects a wheel speed of wheels which rotate by the driving torque generated by the motor. A transmission decelerates the driving torque generated at the motor. A controller is configured to compare a first target wheel speed calculated using the motor speed detected by the resolver to the wheel speed detected by the wheel speed sensor and configured to determine a status of a tire when a wheel slip ratio is less than a predetermined value.

The controller may calculate the first target wheel speed by using the motor speed detected by the resolver, a wheel radius, and a gear ratio of the transmission corresponding to a shift speed.

The first target wheel speed T1 may be calculated from the following equation:

$$T1 = w_m \times \frac{1}{n} \times \frac{2 \cdot \pi \cdot R_w}{60},$$

wherein Wm is the motor speed detected by the resolver, Rw is the wheel radius, and n is a gear ratio of the transmission.

The controller may calculate a second target wheel speed by multiplying the first target wheel speed by a correcting coefficient considering a load condition of the vehicle and a road condition, and determine the status of the tire by comparing the second target wheel speed to the wheel speed detected by the wheel speed sensor.

The correcting coefficient may be determined by a first correcting coefficient considering a throttle opening and a throttle opening variation, a second correcting coefficient considering a vehicle speed and a longitudinal direction acceleration, and a third correcting coefficient considering a vehicle load, and the first correcting coefficient to third correcting coefficient may be predetermined mapping data and may be saved to the controller.

The controller may determine the status of the tire by comparing a final target wheel speed correcting the second target wheel speed by considering cornering of the vehicle to the wheel speed detected by the wheel speed sensor. Wherein the final target wheel speed is calculated from following equations in which Vfo denotes a wheel speed of front outer wheel, Vfi denotes a wheel speed of front inner wheel, Vro denotes a wheel speed of rear outer wheel, Vri denotes a wheel speed of rear inner wheel, Vf denotes a vehicle speed:

$$V_{fo} = V_f \cdot \frac{R_{fo}}{R_f},$$

$$V_{fi} = V_f \cdot \frac{R_{fi}}{R_f},$$

$$V_{ro} = V_r \cdot \frac{R_r + D/2}{R_r}$$

and $$V_{ri} = V_r \cdot \frac{R_r - D/2}{R_r},$$

wherein, Rf denotes a distance from a cornering center to a front driving shaft, Rfi denotes a distance from a cornering center to a front inner wheel, Rfo denotes a distance from a cornering center to a front outer wheel, Rr denotes a distance from a cornering center to a rear driving shaft, and D denotes a distance between an outer wheel and an inner wheel.

The wheel slip ratio (k) may be calculated from the following equation:

$$k = \frac{v_{xf} - T_r}{v_{xf}},$$

wherein Vxf denotes a final vehicle speed, and Tr denotes a real wheel speed detected by the wheel speed sensor.

A tire pressure monitoring method of a motor driven vehicle according to another exemplary embodiment of the present inventive concept is provided in which a resolver detects a motor speed generating a driving torque, a wheel speed sensor detects a wheel speed of wheels rotated by the driving torque generated from the motor, and a controller determines a status of a tire from a signal detected by the resolver and the wheel speed sensor. The method may include calculating a first target wheel speed by using a motor speed detected by the resolver. Whether a wheel slip ratio is greater than a predetermined value is determined. Whether a difference between the first target wheel speed and a real wheel speed detected by the wheel speed sensor is greater than a predetermined value is determined.

The first target wheel speed T1 may be calculated from the following equation:

$$T1 = w_m \times \frac{1}{n} \times \frac{2 \cdot \pi \cdot R_w}{60},$$

wherein Wm is the motor speed detected by the resolver, Rw is the wheel radius, and n is a gear ratio of a transmission.

The tire pressure monitoring method of motor driven vehicle may further include calculating a second target wheel speed by multiplying the first target wheel speed by a correcting coefficient considering a load condition of the vehicle and a road condition. Whether a difference between the second target wheel speed and the wheel speed detected by the wheel speed sensor is greater than a predetermined value is determined.

The correcting coefficient may be determined by a first correcting coefficient considering a throttle opening and a throttle opening variation, a second correcting coefficient considering a vehicle speed and a longitudinal direction acceleration, and a third correcting coefficient considering a vehicle load, The first correcting coefficient to third correcting coefficient may be predetermined mapping data saved to the controller.

The tire pressure monitoring method of motor driven vehicle may further include calculating a final target wheel speed correcting the second target wheel speed according to a cornering status of a vehicle. Whether a difference between the final target wheel speed and a real wheel speed detected by the wheel speed sensor is greater than a predetermined value is determined.

The final target wheel speed is calculated from the following equations in which Vfo denotes a wheel speed of front outer wheel, Vfi denotes a wheel speed of front inner wheel, Vro denotes a wheel speed of rear outer wheel, Vri denotes a wheel speed of rear inner wheel, Vf denotes a vehicle speed:

$$V_{fo} = V_f \cdot \frac{R_{fo}}{R_f},$$

$$V_{fi} = V_f \cdot \frac{R_{fi}}{R_f},$$

$$V_{ro} = V_r \cdot \frac{R_r + D/2}{R_r}$$

and $$V_{ri} = V_r \cdot \frac{R_r - D/2}{R_r},$$

wherein Rf denotes a distance from a cornering center to a front driving shaft, Rfi denotes a distance from a cornering center to a front inner wheel, Rfo denotes a distance from a cornering center to a front outer wheel, Rr denotes a distance from a cornering center to a rear driving shaft, and D denotes a distance between an outer wheel and an inner wheel.

According to the exemplary embodiment of the present inventive concept, since the tire pressure is indirectly measured by using a resolver and a wheel speed sensor without additional sensors for measuring the tire pressure, manufacturing cost can be reduced.

Further, the tire status can be accurately determined by comparing the final target wheel speed to the real wheel speed.

BRIEF DESCRIPTION OF THE DRAWINGS

The drawings are provided for reference in describing exemplary embodiments of the present inventive concept, and the spirit of the present inventive concept should not be construed only by the accompanying drawings.

FIG. 3 is a flowchart illustrating a tire pressure monitoring method according to an exemplary embodiment of the present inventive concept.

DETAILED DESCRIPTION OF THE EMBODIMENTS

Figure 1:
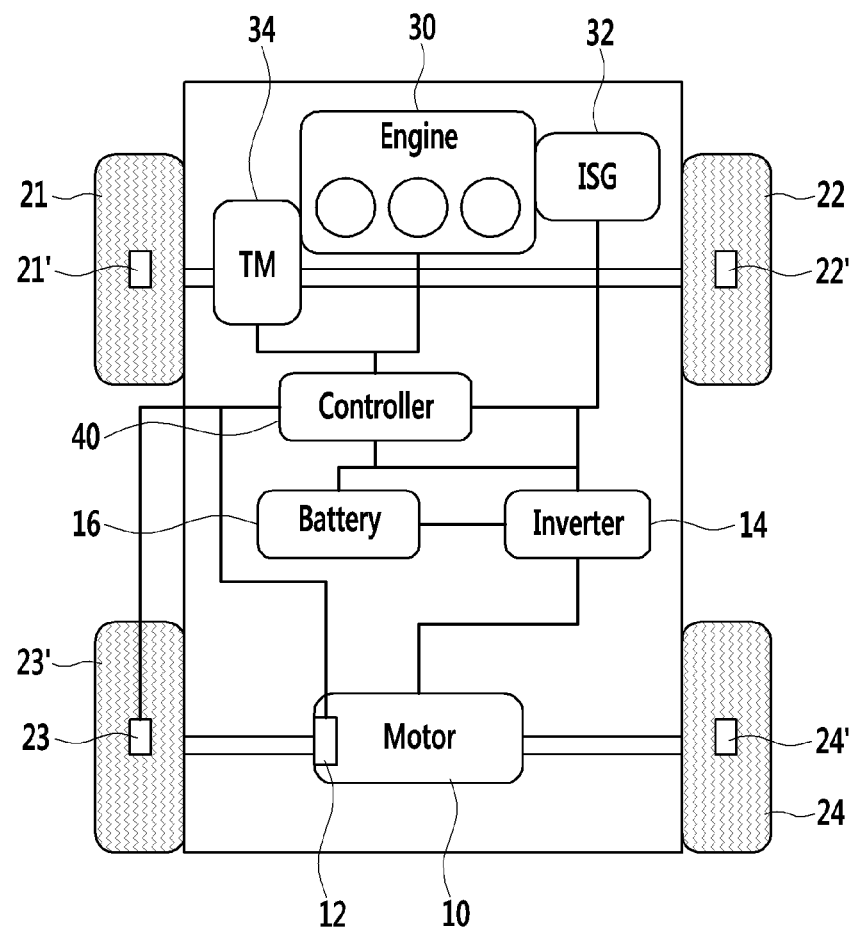
FIG. 1 is a schematic view illustrating a tire pressure monitoring system according to an exemplary embodiment of the present inventive concept.

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In order to clearly describe the present disclosure, portions that are not connected with the description will be omitted. Like reference numerals designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

FIG. 1 is a schematic view illustrating a tire pressure monitoring system according to an exemplary embodiment of the present inventive concept.

As shown in FIG. 1, a tire pressure monitoring system according to an exemplary embodiment of the present inventive concept includes a motor 10 for generating a driving torque, a resolver 12 for detecting a motor speed, wheel speed sensors 21', 22', 23', and 24' for detecting a wheel speed of wheels 21, 22, 23, and 24 rotated by the driving torque generated at the motor 10, and a transmission 34 for decelerating the driving torque generated by the motor 10. A controller 40 is configured to determine a tire status by comparing a first target wheel speed by using the motor speed detected by the resolver 12 with the wheel speed detected by the wheel speed sensors 21', 22', 23', and 24'.

The motor 10 is supplied with an electrical power from a battery 16 provided in a vehicle, and is driven through an inverter 14. An Integrated starter and generator (ISG) 32 is provided in an engine 30. The ISG 32 starts the engine 30 or generates electricity by an output of the engine 30.

A throttle valve (not shown) is provided in the engine 30, the throttle valve adjusts an amount of air flowing into a cylinder of the engine 30, and a throttle position sensor (TPS) detecting opening of the throttle valve is provided at the throttle valve. The opening of the throttle valve and the throttle opening variation detected by the TPS is supplied to the controller 40.

The transmission 34 is disposed between the motor 10 and the wheel (21, 22, 23, and 24) of the vehicle. A shift gear (not shown) is provided in the transmission 34, and an output torque and an output speed are changed and transmitted to a driving shaft according to a gear stage of the shift gear.

The resolver 12 is provided in the motor 10. The resolver 12 measures an absolute position of a rotor with respect to a motor stator and detects the motor speed. The motor speed detected by the resolver 12 is supplied to the controller 40.

The wheels (21, 22, 23, and 24) are driven by the driving torque of the motor 10, and tires are mounted outside of the wheels (21, 22, 23, and 24). The wheel speed sensors (21', 22', 23', and 24') are provided at the wheels (21, 22, 23, 24), and detect the wheel speed of the wheels. Each of the wheel speeds detected by the wheel speed sensors (21', 22', 23', 24') are supplied to the controller 40.

The controller 40 compares the motor speed detected by the resolver 12 to a wheel speed detected by the wheel speed sensor, and monitors a tire status mounted outside of the wheels.

The controller 40 can be implemented with one or more processors activated by a predetermined program, and the predetermined program causes the controller to perform each step of a tire pressure monitoring method according to an embodiment of this inventive concept.

A basic principle of the present disclosure will be described.

It is possible to obtain a steady-state wheel speed by using a rotation speed of the motor 10 and a reduction ratio of the shift gear. And a wheel speed of a tire can be obtained from a wheel speed sensor provided in the wheel. At this time, a status of the tire can be determined by comparing the steady-state wheel speed to the wheel speed obtained from the wheel speed sensors.

For example, a diameter of the tire decreases when air pressure of the tire becomes low. At this time, the wheel speed is detected by the resolver 12, but the wheel speed detected by the wheel speed sensor compared to when the tire pressure is normal becomes faster. Therefore, it is possible to determine the tire pressure by comparing the wheel speed calculated through the resolver 12 to a real wheel speed detected by the wheel speed sensor.

Hereinafter, tire pressure monitoring according to an exemplary embodiment of the present inventive concept will be described in detail with reference to FIG. 3.

The controller 40 calculates a first target wheel speed by using the motor speed detected by the resolver 12, a reduction ratio corresponding to the shift-gear stage of the transmission 34, and a wheel radius at step S10. The first target wheel speed can be calculated from the following equation.

$$T1 = w_m \times \frac{1}{n} \times \frac{2 \cdot \pi \cdot R_w}{60} \qquad \text{(Equation 1)}$$

Herein, T1 denotes the first target wheel speed, Wm denotes the motor speed detected by the resolver 12, n denotes the reduction ratio, and Rw denotes the wheel radius.

The controller 40 calculates a second target wheel speed that corrects the first target wheel speed according to a load condition of the vehicle and a road condition at step S20. The second target wheel speed is calculated by multiplying a correcting coefficient by the first target wheel speed. The correcting coefficient is a value of which the load condition of the vehicle and the road condition are numerically digitized.

The correcting coefficient is experimentally obtained data according to the throttle opening detected by the TPS, the throttle opening variation detected by the TPS, the vehicle speed, a longitudinal direction acceleration of the vehicle, and a load of the vehicle. The correcting coefficient is saved to the controller 40 as map data.

The second target wheel speed can be expressed by the following equation.

$$T2 = (\text{Map}_{(TPS, dTPS)} + \text{Map}_{(Vx, Ax)} + P_{load}) \cdot T1 \qquad \text{(Equation 2)}$$

Here, T2 denotes the second target wheel speed, Map(TPS, dTPS) denotes a first correcting coefficient considering the throttle opening and the throttle opening variation, Map(Vx, Ax) denotes a second correcting coefficient considering the vehicle speed and the longitudinal direction acceleration, and Pload denotes a third correcting coefficient considering the load of the vehicle.

The controller 40 calculates a final target wheel speed by correcting the second target wheel speed according to a cornering status of the vehicle at step S30.

Figure 2:
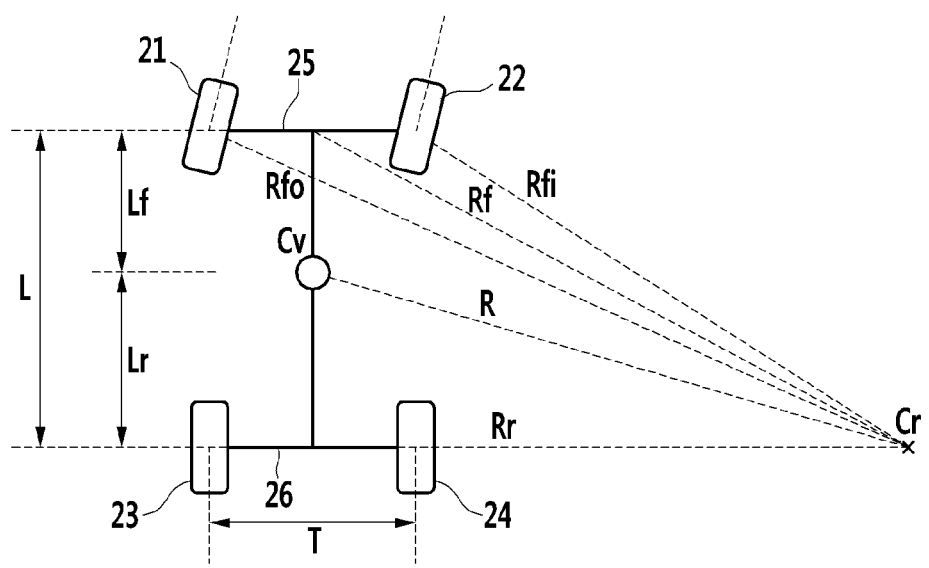
FIG. 2 is a geometrical schematic view illustrating a cornering status of a vehicle.

FIG. 2 is a geometrical schematic view illustrating a cornering status of a vehicle. FIG. 2 is exemplified when the vehicle turns right.

In FIG. 2, Cr denotes a cornering center of the vehicle, R denotes a distance between the cornering center and a mass center of the vehicle, Rfi denotes a distance between the cornering center and a center of the front right wheel, Rf denotes a distance between the cornering center and a center of a front driving shaft, Rfo denotes a distance between the cornering center and a center of the front left wheel, Rr denotes a distance between the cornering center and a center of a rear driving shaft, D denotes a distance between the left wheel and the right wheel, L denotes a distance between the front wheel and the rear wheel, Lf denotes a distance between the mass center and the front driving shaft, and Lr denotes a distance between the mass center and the rear driving shaft.

The controller 40 calculates a front wheel speed (Vf), a rear wheel speed (Vr), a front outer wheel speed (Vfo), a front inner wheel speed (Vfi), a rear outer wheel speed (Vro), and rear inner wheel speed (Vri) from a vehicle speed (Vx) and geometric elements of FIG. 2.

The vehicle speed (Vx) is calculated by averaging the second target wheel speed of each wheel. In a four-wheel drive vehicle, the vehicle speed (Vx) is calculated by averaging the second target wheel speed of four wheels.

In a two-wheel drive vehicle, the vehicle speed (Vx) is calculated by averaging the second target wheel speed of non-driving wheels. In a two-wheel drive vehicle, slip is not generated in the non-driving wheels. Therefore, an average value of the non-driving wheels is similar to the vehicle speed, and thereby the vehicle speed (Vx) is calculated by the average value of the non-driving wheels.

The front outer wheel speed (Vfo), front inner wheel speed (Vfi), rear outer wheel speed (Vro), and rear inner wheel speed (Vri) become the final target wheel speed.

The wheel speeds are calculated from the following equations.

$$V_f = V_x \cdot \frac{R_f}{R}$$ (Equation 3)

$$V_r = V_x \cdot \frac{R_r}{R}$$

$$V_{fo} = V_f \cdot \frac{R_{fo}}{R_f}$$

$$V_{fi} = V_f \cdot \frac{R_{fi}}{R_f}$$

$$V_{ro} = V_r \cdot \frac{R_r + D/2}{R_r}$$

$$V_{ri} = V_r \cdot \frac{R_r - D/2}{R_r}$$

The controller 40 calculates a wheel slip ratio of the vehicle, and determines whether the wheel slip ratio is greater than a predetermined value at step S40. When the wheel slip ratio is greater than the predetermined value, the wheels freely rotate. In this case, the controller does not need to compare the final target wheel speed to the real wheel speed. Therefore, the controller 40 does not monitor the tire status by comparing the final target wheel speed to the real wheel speed.

The wheel slip ratio can be calculated from the following equation.

$$k = \frac{v_{xf} - T_r}{v_{xf}}$$ (Equation 4)

Here, k denotes the wheel slip ratio, Vxf denotes final vehicle speed, and Tr denotes the real wheel speed. The final vehicle speed (Vxf) is calculated by averaging the final target wheel speed of each wheel.

When the wheel slip ratio is less than the predetermined value, the controller 40 compares the final target wheel speed to the real wheel speed, and determines whether a difference between the final target wheel speed and the real wheel speed is greater than a predetermined value at step S50.

When the difference between the final target wheel speed and the real wheel speed is greater than the predetermined value, the controller 40 determines that there is a problem in the air pressure of the tire or the tire is flat at step S60.

As described above, the tire pressure monitoring system of the motor driven vehicle according to an exemplary embodiment of the present inventive concept calculated the final target wheel speed by using the motor speed detected by the resolver 12. When the difference between the final target wheel speed and the real wheel speed is greater than the predetermined value, the controller 40 determines that the tire is abnormal and warns a driver that there is a problem in the tire.

According to the present disclosure, since additional pressure sensors are not necessary, manufacturing cost of the vehicle can be reduced.

Further, since the final target wheel speed is calculated by considering the load condition of the vehicle, the road condition, and cornering status of the vehicle, the final target wheel speed can be accurately calculated. Therefore, it is possible to accurately calculate a relationship between the final target wheel speed and the real wheel speed.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A tire pressure monitoring system of a motor driven vehicle, the system comprising:
    a resolver for detecting a speed of a motor which generates a driving torque;
    a wheel speed sensor for detecting a wheel speed of wheels which rotate by the driving torque generated by the motor;
    a transmission for decelerating the driving torque generated at the motor; and
    a controller configured to compare a first target wheel speed calculated using the motor speed detected by the resolver with the wheel speed detected by the wheel speed sensor and configured to determine a status of a tire, when a wheel slip ratio is less than a predetermined value,
    wherein the controller calculates the first target wheel speed by using the motor speed detected by the resolver, a wheel radius, and a gear ratio of the transmission corresponding to a shift speed.

2. The tire pressure monitoring system of claim 1,
    wherein the first target wheel speed T1 is calculated from the following equation:

$$T1 = w_m \times \frac{1}{n} \times \frac{2 \cdot \pi \cdot R_w}{60},$$

wherein Wm is the motor speed detected by the resolver, Rw is the wheel radius, and n is the gear ratio of the transmission.

3. The tire pressure monitoring system of claim 1,
    wherein the controller calculates a second target wheel speed by multiplying the first target wheel speed by a correcting coefficient considering a load condition of the vehicle and a road condition, and
    determines the status of the tire by comparing the second target wheel speed to the wheel speed detected by the wheel speed sensor.

4. The tire pressure monitoring system of claim 3,
    wherein the correcting coefficient is determined by a first correcting coefficient considering a throttle opening and a throttle opening variation, a second correcting coefficient considering a vehicle speed and a longitudinal direction acceleration, and a third correcting coefficient considering a vehicle load, and
    the first correcting coefficient to the third correcting coefficient are predetermined mapping data and are saved to the controller.

5. The tire pressure monitoring system of claim 3,
    wherein the controller determines the status of the tire by comparing a final target wheel speed while correcting the second target wheel speed by considering cornering of the vehicle to the wheel speed detected by the wheel speed sensor, wherein the final target wheel speed is calculated from the following equations in which a front outer wheel speed Vfo, a front inner wheel speed Vfi, a rear outer wheel speed Vro, and a rear inner wheel speed Vri are the final target wheel speed:

$$V_{fo} = V_f \cdot \frac{R_{fo}}{R_f},$$

$$V_{fi} = V_f \cdot \frac{R_{fi}}{R_f},$$

$$V_{ro} = V_r \cdot \frac{R_r + D/2}{R_r}$$

and $$V_{ri} = V_r \cdot \frac{R_r - D/2}{R_r},$$

wherein Vf denotes a vehicle speed, Rf denotes a distance from a cornering center to a front driving shaft, Rfi denotes a distance from a cornering center to a front inner wheel, Rfo denotes a distance from a cornering center to a front outer wheel, Rr denotes a distance from a cornering center to a rear driving shaft, and D denotes a distance between an outer wheel and an inner wheel.

6. The tire pressure monitoring system of a motor driven vehicle of claim 1,
wherein the wheel slip ratio (k) is calculated from the following equation:

$$k = \frac{v_{xf} - T_r}{v_{xf}},$$

wherein Vxf denotes a final vehicle speed, and Tr denotes a real wheel speed detected by the wheel speed sensor.

7. The tire pressure monitoring system of a motor driven vehicle of claim 1, further comprising an integrated starter and generator (ISG) provided in an engine, the ISG starting the engine or generating an electricity by an output of the engine.

8. A tire pressure monitoring method of a motor driven vehicle, in which a resolver detects a motor speed generating a driving torque, a wheel speed sensor detects a wheel speed of wheels rotated by the driving torque generated at the motor, and a controller determines a status of a tire from a signal detected by the resolver and the wheel speed sensor, the method comprising steps of:
calculating a first target wheel speed by using a motor speed detected by the resolver;
determining whether a wheel slip ratio is greater than a predetermined value; and
determining whether a difference between the first target wheel speed and a real wheel speed detected by the wheel speed sensor is greater than a predetermined value,
wherein the controller calculates the first target wheel speed by using the motor speed detected by the resolver, a wheel radius, and a gear ratio of a transmission corresponding to a shift speed.

9. The tire pressure monitoring method of claim 8,
wherein the first target wheel speed T1 is calculated from the following equation:

$$T1 = w_m \times \frac{1}{n} \times \frac{2 \cdot \pi \cdot R_w}{60},$$

wherein Wm is the motor speed detected by the resolver, Rw is the wheel radius, and n is the gear ratio of the transmission.

10. The tire pressure monitoring method of claim 8, after the step of calculating the first target wheel speed, further comprising steps of:
calculating a second target wheel speed by multiplying the first target wheel speed by a correcting coefficient considering a load condition of the vehicle and a road condition; and
determining whether a difference between the second target wheel speed and the wheel speed detected by the wheel speed sensor is greater than a predetermined value.

11. The tire pressure monitoring method of claim 10,
wherein the correcting coefficient is determined by a first correcting coefficient considering a throttle opening and a throttle opening variation, a second correcting coefficient considering a vehicle speed and a longitudinal direction acceleration, and a third correcting coefficient considering a vehicle load, and
the first correcting coefficient to third correcting coefficient are predetermined mapping data saved to the controller.

12. The tire pressure monitoring method of claim 10, further comprising steps of:
calculating a final target wheel speed correcting the second target wheel speed according to a cornering status of a vehicle; and
determining whether a difference between the final target wheel speed and a real wheel speed detected by the wheel speed sensor is greater than a predetermined value.

13. The tire pressure monitoring method of claim 12,
wherein the final target wheel speed is calculated from the following equations in which a front outer wheel speed Vfo, a front inner wheel speed Vfi, a rear outer wheel speed Vro, and a rear inner wheel speed Vri are the final target wheel speed:

$$V_{fo} = V_f \cdot \frac{R_{fo}}{R_f},$$

$$V_{fi} = V_f \cdot \frac{R_{fi}}{R_f},$$

$$V_{ro} = V_r \cdot \frac{R_r + D/2}{R_r}$$

and $$V_{ri} = V_r \cdot \frac{R_r - D/2}{R_r},$$

wherein Rf denotes a distance from a cornering center to a front driving shaft, Rfi denotes a distance from a cornering center to a front inner wheel, Rfo denotes a distance from a cornering center to a front outer wheel, Rr denotes a distance from a cornering center to a rear driving shaft, and D denotes a distance between an outer wheel and an inner wheel.

14. A non-transitory computer-readable recording medium comprising computer executable instructions which cause a controller to perform the method according to claim 8.

* * * * *